(12) United States Patent
Watanabe et al.

(10) Patent No.: US 6,797,663 B2
(45) Date of Patent: Sep. 28, 2004

(54) CATALYST FOR EXHAUST GAS PURIFICATION

(75) Inventors: Tetsuya Watanabe, Tokyo (JP); Osamu Nakayama, Tokyo (JP); Keisuke Tashiro, Tokyo (JP); Kinichi Iwachido, Tokyo (JP); Hiroshi Tanada, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 8 days.

(21) Appl. No.: 10/258,487

(22) PCT Filed: Feb. 26, 2002

(86) PCT No.: PCT/JP02/01729

§ 371 (c)(1),
(2), (4) Date: Oct. 25, 2002

(87) PCT Pub. No.: WO02/068118

PCT Pub. Date: Sep. 6, 2002

(65) Prior Publication Data

US 2003/0139282 A1 Jul. 24, 2003

(30) Foreign Application Priority Data

Feb. 26, 2001 (JP) ........................................ 2001-050522

(51) Int. Cl.[7] ............................................... B01J 29/06
(52) U.S. Cl. ............................. 502/66; 502/64; 502/74; 502/305; 502/313; 502/325; 502/339; 502/349; 502/353; 502/240; 502/262; 502/261
(58) Field of Search ............................. 502/64, 66, 74, 502/305, 313, 325, 339, 349, 353, 240, 261, 262

(56) References Cited

U.S. PATENT DOCUMENTS

| | | | | |
|---|---|---|---|---|
| 5,401,478 A | * | 3/1995 | Chang et al. ................ 423/235 |
| 5,597,771 A | | 1/1997 | Hu et al. |
| 6,004,521 A | * | 12/1999 | Miyoshi et al. ........... 423/213.5 |
| 6,047,544 A | * | 4/2000 | Yamamoto et al. ............ 60/285 |
| 6,066,587 A | * | 5/2000 | Kurokawa et al. ............. 502/66 |
| 6,217,831 B1 | * | 4/2001 | Suzuki et al. ................ 422/177 |
| 6,221,804 B1 | * | 4/2001 | Yamada et al. .............. 502/326 |
| 6,537,946 B1 | * | 3/2003 | Tanada et al. ............... 502/344 |
| 2002/0022574 A1 | * | 2/2002 | Tanada et al. .......... 502/527.12 |
| 2003/0008773 A1 | * | 1/2003 | Watanabe .................... 502/240 |
| 2003/0144132 A1 | * | 7/2003 | Tanada et al. ................. 502/64 |

FOREIGN PATENT DOCUMENTS

| EP | 0 335 847 A1 | 10/1989 |
|---|---|---|
| EP | 0 904 827 A1 | 3/1999 |
| EP | 1 008 378 A1 | 6/2000 |
| EP | 1 166 853 A1 | 1/2002 |
| JP | 9-85093 | 3/1997 |
| JP | 10-151357 A | 6/1998 |
| JP | 2000-110554 A | 4/2000 |
| JP | 2000-176298 A | 6/2000 |
| JP | 2000-279810 | 10/2000 |
| JP | 2001-179098 A | 7/2001 |
| JP | 2002-95973 A | 4/2002 |

* cited by examiner

*Primary Examiner*—Kliey Stoner
*Assistant Examiner*—Christina Ildebrando
(74) *Attorney, Agent, or Firm*—Birch, Stewart, Kolasch & Birch, LLP (57) ABSTRACT

An exhaust gas clean-up catalyst having a catalytic layer which contains, as an occluding agent, at least one (potassium and/or the like) chosen from a group consisting of alkaline metals and alkaline earth metals. The catalytic layer consists of a first catalytic layer (20) which contains the occluding agent (potassium and/or the like) and an acid material (30) having a high affinity to the occluding agent, and a second catalytic layer (40) which contains the occluding agent and does not contain the acid material.

6 Claims, 3 Drawing Sheets

CATALYST FOR EXHAUST GAS PURIFICATION

This application is the national phase under 35 U.S.C. §371 of PCT International Application No. PCT/JP02/01729 which has an International filing date of Feb. 26, 2002, which designated the United States of America.

TECHNICAL FIELD

The present invention relates to an exhaust gas clean-up catalyst, especially an exhaust gas clean-up catalyst capable of keeping a clean-up ability high.

BACKGROUND ART

In order to improve fuel consumption characteristic and exhaust gas characteristic, lean-burn engines such as lean-burn engines, in-cylinder fuel injection engines, etc. are operated at a lean air-fuel ratio which is leaner than the stoichiometric air-fuel ratio, in predetermined operating regions. While the engine is operated at a lean air-fuel ratio, $NO_x$ (nitrogen oxide) contained in exhaust gas cannot sufficiently be removed by a three-way catalyst. Thus, it is known to provide an $NO_x$ catalyst which occludes $NO_x$ contained in exhaust gas in an oxidative atmosphere, and reduce the $NO_x$ occluded by the $NO_x$ catalyst to $N_2$ (nitrogen) in a reducing atmosphere, to thereby reduce the emission of $NO_x$ into the atmosphere. As an occlusion-type lean $NO_x$ catalyst of this kind, there is one whose $NO_x$ occluding ability is improved by adding potassium (K), which is an alkaline metal, as an $NO_x$ occluding agent, as disclosed, for example, in Japanese Unexamined Patent Publication No. Hei 9-85093.

However, when the $NO_x$ catalyst having potassium added is placed in high temperature for a long time, cracks form in the catalyst in some cases. Such cracks lower the durability of the $NO_x$ catalyst.

In order to find out causes of the lowering of the durability of the $NO_x$ catalyst, the inventors of the present invention produced an $NO_x$ catalyst in which the above-mentioned potassium (K), which is an alkaline metal, was added as an $NO_x$ occluding agent to a catalytic layer supported by a honeycomb-type cordierite support (porous support), and carried out a bench test of an engine equipped with the $NO_x$ catalyst, and a driving test of a vehicle having such an engine installed. In the bench test and the practical vehicle driving test, the engine and the vehicle were operated and driven in the conditions in which the $NO_x$ catalyst was exposed to high temperature of 650° C. and above for quite a long time. After the engine and the vehicle were thus operated and driven, elemental analysis of the $NO_x$ catalyst was carried out on its cutting plane by EPMA (Electron Probe Microanalysis). By this, it was found that in the cordierite $(Mg_2Al_4Si_5O_{18})$ layer of the catalyst existed $KMg_4Al_9Si_9O_{36}$, a compound of potassium, magnesium, aluminum, silicon and oxygen, and $KAlSiO_4$, a compound of potassium, aluminum, silicon and oxygen.

From the above experiment, it is thought that when the $NO_x$ catalyst is exposed to high temperature, potassium which has been added to the catalytic layer (wash coat) penetrates into the cordierite support and reacts with cordierite in a high-temperature atmosphere to form the above-mentioned compounds. Here, it is thought that since potassium compounds are high in water solubility and low in melting point, potassium easily penetrates into the cordierite support. When compounds having a thermal expansion coefficient different from that of cordierite is formed in the cordierite support, cracks form in the cordierite support due to change in the catalyst temperature during, before and after the use of the catalyst, and thus the strength of the catalyst lowers.

As mentioned above, the $NO_x$ catalyst which contains potassium or the like as an occluding agent is used in an oxidative atmosphere. In the oxidative atmosphere, nitrate ($—NO_3$) of the occluding agent is formed by chemical reaction of the occluding agent with nitrogen contained in exhaust gas, and hence, the $NO_x$ occluding ability lowers. Here, the occluding ability can be restored by forming a reducing atmosphere around the $NO_x$ catalyst and thereby degrading the nitrate. However, even when such measures are taken, the clean-up ability lowers in some cases in which the $NO_x$ catalyst is used in high temperature for a long time.

From the results of an experiment carried out by the inventors, it is thought that one of the causes of the clean-up ability lowering lies in the occluding agent gradually vaporizing and escaping from the $NO_x$ catalyst in high temperature, thus a large amount of the occluding agent in the catalyst getting lost. Specifically, the inventors produced an $NO_x$ catalyst in which a cordierite support supported a catalytic layer which contained potassium as an occluding agent, and obtained the amount of potassium contained in the unused $NO_x$ catalyst by XRF (X-ray Fluorescence Spectrochemical Analysis). Then, after using the catalyst in high temperature for a long time (for example, in 850° C. for 32 hours), the amount of potassium contained in the catalyst was obtained. Then, the ratio of the lost potassium was obtained by dividing the difference between the amount of potassium contained in the unused catalyst and the amount of potassium contained in the after-use catalyst by the amount of potassium contained in the unused catalyst. It was found that the ratio of the lost potassium was several ten % to 50%.

In this connection, Japanese Unexamined Patent Publication No. 2000-279810 discloses a technique in which, for example, when alkaline metal such as potassium is used as an $NO_x$ occluding agent, silicon which has an affinity to alkaline metal is provided in a catalytic layer to restrain the movement of the alkaline metal into a base (cordierite support) and thereby retain the alkaline metal in the catalytic layer.

However, an occluding agent made of alkaline metal has, as its property, a large electron-donating function. Thus, there is a problem that by emitting electrons, alkaline metal lowers $NO_x$ oxidation performance by precious metal. Specifically, the $NO_x$ occluding catalyst makes NO react with oxygen and also with alkaline metal and occludes $NO_x$ in the form of the above-mentioned nitrate ($—NO_3$), but the electron-donating function of alkaline metal hinders the reaction of NO with oxygen. Occluding agents which are higher in occluding ability such as potassium tend to be higher in electron-donating function.

Thus, when a larger amount of alkaline metal such as potassium is retained in the catalytic layer as in the technique disclosed in the above-mentioned publication, occlusion ability which depends on the reaction of NO with alkaline metal improves, while the oxidation reaction of NO does not go on well. Thus, balance between the reactions is lost, which leads to a problem that $NO_x$ removing ability lowers.

Another problem with the occluding agent made of alkaline metal such as potassium is that alkaline metal reacts with S (sulfur) contained in exhaust gas to form sulfate ($—SO_4$), which deteriorates the $NO_x$ occluding ability. (This is called sulfur-poisoning.) Regarding this problem, it is known that sulfur in exhaust gas can be removed by making the catalyst high in temperature and making the exhaust gas rich in air-fuel ratio to thereby form a reducing atmosphere. (This is called sulfur-purging.) However, sulfur-purging has a problem that if the occluding agent moves and is retained deep below the catalyst surface with which exhaust gas flow comes in contact, the occluding agent which has turned into sulfate is not easily exposed to the high-temperature reducing atmosphere, and hence it takes time to remove sulfur.

DISCLOSURE OF THE INVENTION

The object of the present invention is to provide an exhaust gas clean-up catalyst in which movement of an occluding agent is restrained without lowering the oxidation ability, and degree of lowering of the exhaust-gas clean-up ability is much reduced, and which has high durability.

In order to achieve the above object, the present invention provides an exhaust gas clean-up catalyst comprising a support and a catalytic layer, said catalytic layer containing, as an occluding agent, at least one chosen from a group consisting of alkaline metals and alkaline earth metals, wherein said catalytic layer comprises a first catalytic layer which contains said occluding agent and an acid material having a high affinity to said occluding agent, and a second catalytic layer which contains said occluding agent and does not contain said acid material.

In this exhaust gas clean-up catalyst, since the occluding agent in the first and second catalytic layers combines with the acid material in the first catalytic layer, movement of the occluding agent into the support is restrained, and loss of the occluding agent due to vaporization and escape from the catalyst, etc. is prevented. Here, since the occluding agent in the second catalytic layer moves into the first catalytic layer to combine with the acid material and is retained in the first catalytic layer, the amount of the occluding agent contained in the second catalytic layer reduces. As a result, in the second catalytic layer, oxidation reaction by precious metal goes on well without being hindered by the occluding agent. The oxide formed by the oxidation reaction is occluded well by the occluding agent retained in the first catalytic layer. Thus, the lowering of the exhaust gas clean-up ability of the catalyst is prevented.

Figure 5:
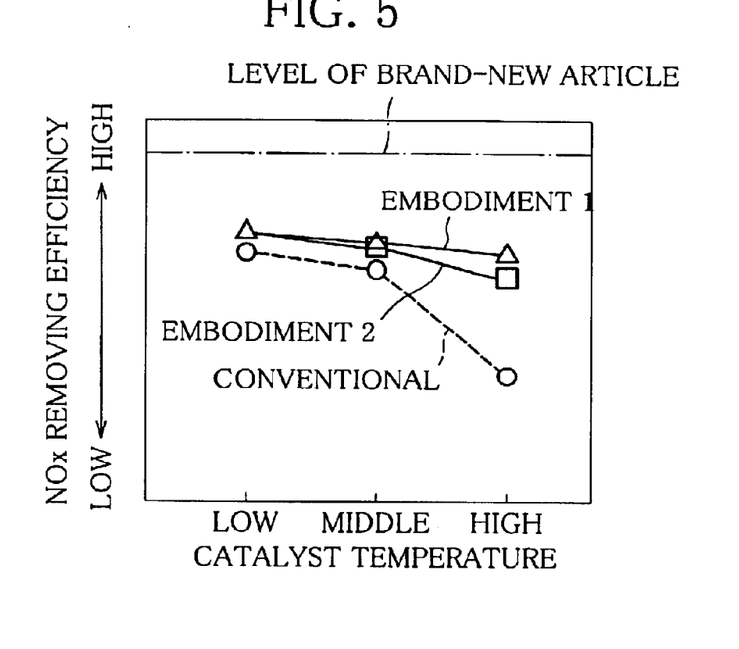
FIG. 5 is a diagram showing the $NO_x$ removing efficiency of an exhaust gas clean-up catalyst after long-time use thereof in high temperature.

The $NO_x$ removing efficiency of the exhaust gas clean-up catalyst after long-time use in high temperature was examined actually. It was found that in the exhaust gas clean-up catalyst according to the present invention, the $NO_x$ removing efficiency was generally kept high, irrespective of the catalyst temperature, as compared with a case in which a simple catalytic layer having no acid material mixed was used (see FIG. 5).

It is to be noted that as long as the acid material can mix with the other materials in the first catalytic layer, the acid material may either be highly dispersed or exist in somewhat large particles or blocks. In any case, the lowering of the exhaust gas clean-up ability of the catalyst can be prevented satisfactorily.

In one mode of the exhaust gas clean-up catalyst according to the present invention, said second catalytic layer is formed on the outside of said first catalytic layer.

In this case, the occluding agent in the second catalytic layer moves into the lower first catalytic layer to combine with the acid material and is retained there, while in the second catalytic layer, oxidation reaction by precious metal goes on well without being hindered by the occluding agent. Thus, the lowering of the exhaust gas clean-up ability of the catalyst is prevented. Since the second catalytic layer is formed on the outside of the first catalytic layer, the second catalytic layer is exposed to exhaust gas flow, and thus the exhaust gas easily comes in contact with precious metal. By this, oxidation reaction by precious metal is promoted very well, so that the exhaust gas clean-up performance improves.

Meanwhile, the first catalytic layer which contains the acid material is not exposed to the exhaust gas flow. Thus, the acid material which is relatively low in thermal resistance is protected well by the upper second catalytic layer.

Further, since the occluding agent is retained in the first catalytic layer which is located deep below the catalyst surface, the loss of the occluding agent due to vaporization and escape from the catalyst, etc. can be prevented better.

In one mode of the exhaust gas clean-up catalyst according to the present invention, said second catalytic layer is formed between said support and said first catalytic layer.

In this case, the occluding agent in the second catalytic layer moves into the upper first catalytic layer to combine with the acid material and is retained there, while in the second catalytic layer, oxidation reaction by precious metal goes on well without being hindered by the occluding agent. Thus, the lowering of the exhaust gas clean-up ability of the catalyst is prevented. Since the first catalytic layer which contains the acid material is formed on the outside of the second catalytic layer, the occluding agent gathers in the first catalytic layer which is exposed to exhaust gas flow, and the exhaust gas easily comes in contact with the occluding agent. Thus, the occluding agent and sulfur contained in the exhaust gas react easily, and the catalyst suffers sulfur-poisoning easily. However, this also means that in sulfur-purging which is carried out by making the catalyst high in temperature and making the exhaust gas rich in air-fuel ratio to form a reducing atmosphere, the occluding agent combined with sulfur is easily exposed to the high-temperature reducing atmosphere. Thus, sulfur is purged easily, and the length of time in which the catalyst needs to be kept at high temperature and the exhaust gas needs to be kept at a rich air-fuel ratio can be shortened. As a result, deterioration of fuel economy can be prevented.

In one mode of the exhaust gas clean-up catalyst according to the present invention, said first catalytic layer further contains at least one precious metal chosen from a group consisting of platinum, rhodium and palladium, and alumina as a base material for said precious metal and said occluding material.

When the acid material becomes a base material for precious metal, the catalytic ability of precious metal tends to lower. However, when alumina is contained and functions as a base material for precious metal, the acid material becoming a base material for precious metal is restrained. As a result, in the first catalytic layer, the lowering of the catalytic ability of precious metal is prevented.

In one mode of the exhaust gas clean-up catalyst according to the present invention, the proportion of said acid material to said alumina is in the range of 1 to 30 wt %.

In this case, when precious metal, the occluding agent, the acid material, alumina, etc. are mixed into slurry for forming the first catalytic layer, the proportion of the acid material is smaller than the proportion of alumina. Thus, most of the precious metal, etc. are supported by alumina, and precious metal supported by the acid material is much reduced. Since alumina surely functions as a main base material, the lowering of the catalytic ability of precious metal in the first catalytic layer is prevented.

Further, since it is ensured that precious metal is supported well by alumina, precious metal, the occluding agent, the acid material, alumina, etc. may be mixed at a time to form slurry. Precious metal does not need to be supported by alumina in advance. Thus, the process of forming the catalytic layer can be simplified.

In one mode of the exhaust gas clean-up catalyst according to the present invention, said second catalytic layer further contains at least one precious metal chosen from a group consisting of platinum, rhodium and palladium, and alumina as a base material for said precious metal and said occluding material.

In this case, apart from the acid material, the materials for the second catalytic layer is the same as those for the first catalytic layer. Thus, if, for the second catalytic layer, the acid material is supported by the cordierite support in advance, the first and second catalytic layers can be formed using the same slurry. This can reduce the production cost.

In one mode of the exhaust gas clean-up catalyst according to the present invention, the first catalytic layer contains at least one material chosen from a group consisting of acid oxides which contain at least one acid substance chosen from among IV-, V-, and VI-group transition elements and IV-, V-, and VI-group typical elements, compound oxides which contain said at least one acid substance, materials which do not hinder reactivity of nitrogen oxide and said occluding agent, and materials which absorb reducing substances.

For example, the first catalytic layer is formed to contain at least one material chosen from a group consisting of acid oxides and compound oxides which contain at least one acid substance. Here, those acid oxides and compound oxides each contain at least one acid substance chosen from a group consisting of IV-, V-, and VI-group transition elements and IV-, V-, and VI-group typical elements.

In this case, the acid oxides and compound oxides which have each a high ability to fix the occluding agent and high thermostability can prevent the loss of the occluding agent and thereby prevent the lowering of the exhaust gas clean-up ability of the catalyst and improve its durability. Here, as a compound oxide, one which is a combination of oxides that has an acid center is desirable.

Here, at least one acid substance should be chosen considering its reactivity with the occluding agent. For example, when the occluding agent is potassium, it is desirable to use acid oxides and/or compound oxides which contain silica and/or tungsten as an acid substance.

As another example, the first catalytic layer is formed to contain an acid material which does not hinder reactivity of $NO_x$ and the occluding agent. In this case, movement of the occluding agent on the catalyst is restrained, and the occluding agent performs its $NO_x$ occluding function well.

As another example, the first catalytic layer is formed to contain an acid material which absorbs reducing substances (for example, reducing gas such as HC). In this case, by the reducing substances trapped due to the reducing-substance absorbing ability, nitrate and sulfate in the first catalytic layer are degraded, so that the $NO_x$ occluding ability is restored.

In one mode of the exhaust gas clean-up catalyst according to the present invention, the occluding agent contains potassium, and the support is a porous support.

When potassium is added as the occluding agent, movement of the occluding agent is restrained well by the acid material. Also, the loss of the occluding agent due to vaporization and escape is prevented, so that the lowering of the exhaust gas clean-up ability of the catalyst is prevented satisfactorily. Further, when the porous support is used, pressure loss of exhaust gas decreases, and exhaust gas comes in contact with the catalytic layer well. Thus, exhaust gas clean-up goes on well. It is to be noted that in the case of a catalyst comprising a porous support, generally, movement and vaporization and escape of the occluding agent happen easily, because exhaust gas containing high-temperature vapor flows through the catalyst better. However, such movement and vaporization and escape of the occluding agent are well prevented by the acid material.

Actually, regarding an engine equipped with an exhaust gas clean-up catalyst according to the present invention in which a cordierite support was used as a porous support and an acid material was mixed in the catalytic layer containing potassium as an occluding agent, a bench test and a vehicle driving test were carried out. After the tests, elemental analysis of the catalyst was carried out on its cutting plane by EPMA. It was found that the amount of potassium contained in the cordierite support was far smaller as compared with a catalyst having a simple catalytic layer in which an acid material was not mixed.

Figure 3:
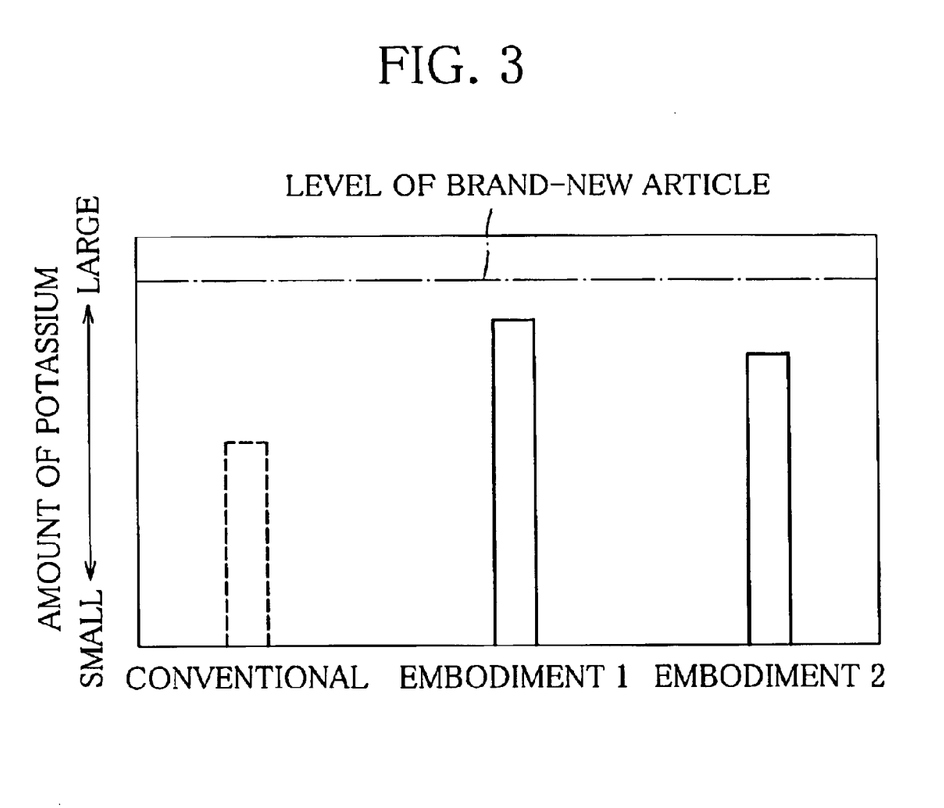
FIG. 3 is a diagram showing the amount of potassium contained in a catalytic layer after long-time use of an exhaust gas clean-up catalyst in high temperature.

The amount of potassium contained in the catalytic layer after long-time use of the exhaust gas clean-up catalyst in high temperature was measured by XRF. It was found that quite a larger amount of potassium remained in the catalytic layer as compared with a catalyst having a simple catalytic layer in which an acid material was not mixed (see FIG. 3).

This result of experiment shows that potassium was well kept in the catalytic layer, and that escape of potassium and penetration of potassium into the cordierite support were restrained sufficiently.

The reason why a large amount of potassium remains in the catalytic layer is thought to be that the acid material is mixed in the catalytic layer. Specifically, it is thought that due to the affinity of the acid material, potassium is dispersed and attracted by particles of the acid material and thus retained well in the catalytic layer.

To sum up, when the occluding agent contains potassium, the occluding agent can be retained well in the catalytic layer without getting lost due to movement and escape. Thus, formation of compounds, which is caused by the occluding agent which has penetrated into the porous support, is restrained, so that formation of cracks in the porous support is prevented satisfactorily. As a result, the durability of the exhaust gas clean-up catalyst improves, and the exhaust gas clean-up ability is maintained satisfactorily.

In one mode of the exhaust gas clean-up catalyst according to the present invention, the first catalytic layer contains zeolite.

When the first catalytic layer contains zeolite which, as an acid material, has an affinity to the occluding agent and also has a cation exchange ability, additional advantages are obtained besides the above-mentioned ones.

Specifically, in some cases, in the presence of high-temperature vapor, the occluding agent which moves within the catalyst is ionized. When zeolite is contained in the first catalytic layer, the ionized occluding agent is fixed as ions due to the cation exchange ability of the acid center of zeolite (see FIG. 4), and thus hindered from moving toward the support.

Further, zeolite, which has a three-dimensional network structure and a large specific surface area, has a molecular sieving function, and the occluding agent is highly dispersed over this structure of zeolite. Thus, the occluding agent is less likely to penetrate into the support.

Even when the internal combustion engine is operating in a lean state, exhaust gas contains a small amount of HC. Meanwhile, zeolite has a high ability to fix the occluding agent and a high ability to absorb HC. HC absorbed by zeolite promotes degradation of nitrate and sulfate of the occluding agent. To sum up, even during lean operation of the engine, zeolite having an HC absorbing ability continuously degrades nitrate and sulfate of the occluding agent by using the small amount of HC which is contained in exhaust gas, and thereby contributes to restoration of the $NO_x$ occluding ability of the catalyst.

BEST MODE OF CARRYING OUT THE INVENTION

A mode of carrying out an exhaust gas clean-up catalyst according to the present invention will be described below.

First, embodiment 1 will be described.

Figure 1:
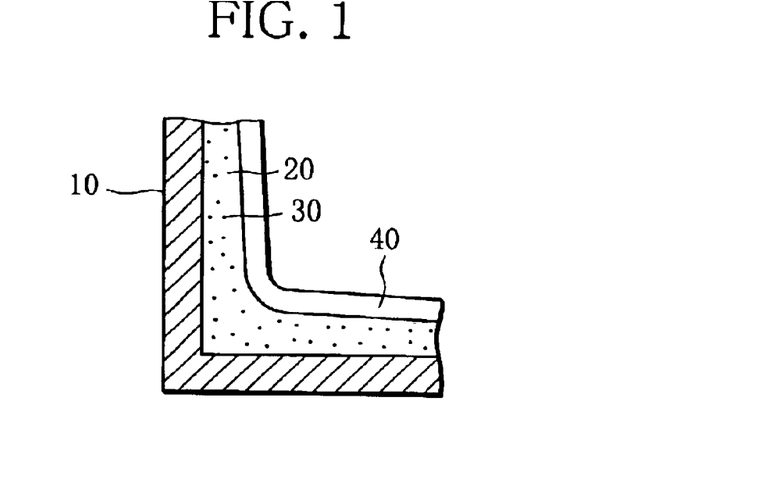
FIG. 1 is a partial enlarged cross-section showing a quarter of a cell of an exhaust gas clean-up catalyst according to embodiment 1 of the present invention.

An exhaust gas clean-up catalyst is formed as an $NO_x$ catalyst having a honeycomb (monolith) type cordierite support consisting of many cells. FIG. 1 shows part of a cell of a cordierite support of embodiment 1. Cells of a cordierite support 10 are, for example, quadrangular in cross-section. In embodiment 1, a first catalytic layer 20 covers the surface of the cordierite support 10, and a second catalytic layer 40 covers the surface of the first catalytic layer 20.

The cordierite support 10 is produced as follows: For example, alumina-source powder, silica-source powder and magnesia-source powder are mixed in the proportion corresponding to the composition of cordierite, and the mixture is dispersed in water. The solid part of the dispersion is molded into a honeycomb shape and baked.

The first catalytic layer 20 is formed, for example, as follows: First, slurry which contains at least one precious metal chosen from a group consisting of platinum, rhodium and palladium, alkaline metal such as potassium (K) and/or alkaline earth metal such as barium (Ba), which are each an $NO_x$ occluding agent, alumina, and acid material such as silicon (Si) 30 is prepared. Then, the cordierite support 10 is immersed in the slurry, then dried, and then baked. As a result, a catalytic layer is formed, in which alumina as a base material supports precious metal and alkaline metal such as potassium (K) and/or alkaline earth metal such as barium (Ba), and acid material 30 is mixed with those precious metal, alkaline metal and alkaline earth metal.

Figure 2:
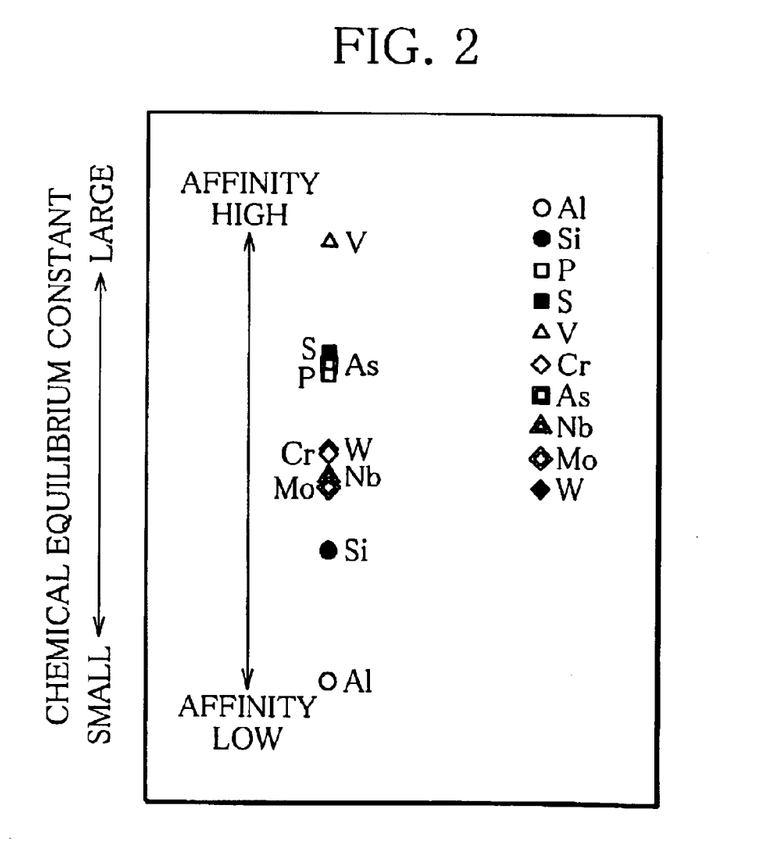
FIG. 2 is a diagram showing the affinity to potassium of acid materials.

While potassium (K) and barium (Ba) are typical examples of the $NO_x$ occluding agent, the $NO_x$ occluding agent is not restricted to them. Any other alkaline metal or alkaline earth metal can be used as the $NO_x$ occluding agent. Further, while silica (silicon oxide) is a typical example of the acid material 30, any of IV-, V-, and VI-group transition elements and IV-, V-, and VI-group typical elements (P, S, V, Cr, As, Nb, Mo, W, etc.) as shown in FIG. 2 can be used as the acid material 30. As shown in FIG. 2, an element having a higher affinity to alkaline metal or alkaline earth metal is more desirable. (In FIG. 2, by way of example, the affinity to potassium is shown.) Taking the reactivity with the $NO_x$ occluding agent into consideration, when the $NO_x$ occluding agent is, for example, potassium, it is desirable that the acid material 30 is silicon (Si) and/or tungsten (W). Further, it is desirable that the acid material 30 is a material which does not hinder the reactivity of $NO_x$ and the $NO_x$ occluding agent.

Composite materials (compound oxides) which have an affinity to the $NO_x$ occluding agent can be used as the acid material 30. Thus, for example, zeolite which has a cation exchange ability, which is equivalent to the affinity to the $NO_x$ occluding agent, can be used as the acid material 30.

The second catalytic layer 40 is formed, for example, as follows: First, slurry which contains at least one precious metal chosen from a group consisting of platinum, rhodium and palladium, alkaline metal and/or alkaline earth metal such as potassium (K) and/or barium (Ba), which are each an $NO_x$ occluding agent, and alumina is prepared. Then, the cordierite support 10 with the first catalytic layer 20 on is immersed in the slurry, then dried, and then baked. As a result, a catalytic layer is formed, in which alumina as a base material supports precious metal and alkaline metal such as potassium (K) and/or alkaline earth metal such as barium (Ba). The second catalytic layer thus contains precious metal and alkaline metal and/or alkaline earth metal, but does not contain acid material 30.

The $NO_x$ catalyst comprising the cordierite support 10 and two coatings, i.e., the first catalytic layer 20 and the second catalytic layer 40 is obtained in the above-described way. As conventionally known, the $NO_x$ catalyst is placed in a case with buffer material between, and arranged in an exhaust pipe of a lean-burn internal combustion engine.

In the case of this $NO_x$ catalyst, when the engine is operating at a lean air-fuel ratio, $NO_x$ in exhaust gas is occluded in the form of nitrate under the action of catalyst seeds dispersed in the first and second catalytic layers 20 and 40. When the engine is operating at a rich air-fuel ratio, nitrate is degraded, and the occluded $NO_x$ is reduced to nitrogen and emitted from the $NO_x$ catalyst into the atmosphere.

When an internal combustion engine equipped with an $NO_x$ catalyst of this type is operated for a long time, the $NO_x$ catalyst is exposed to high temperature for a long time. In these conditions, in the case of a conventional $NO_x$ catalyst in which a cordierite support is coated with a catalytic layer to which only potassium and/or barium (hereinafter referred to simply as "potassium"), which are each an $NO_x$ occluding agent, is added, potassium moves into the cordierite support, reacts with silica or the like contained in the cordierite support and forms compounds, as already stated. As a result, cracks form in the cordierite support, which lowers the durability of the $NO_x$ catalyst.

In contrast, elemental analysis by EPMA has shown that in the case of the $NO_x$ catalyst according to embodiment 1, even when the $NO_x$ catalyst is used in high temperature for a long time, the formation of compounds of potassium, which is added to the first and second catalytic layers 20 and 40, and silica, which is contained in the cordierite support 10, is restrained.

As already stated, one reason for this is thought as follows: Besides potassium, acid material 30 such as silicon is mixed in the first catalytic layer 20. Due to the affinity of the acid material 30, potassium in the first and second catalytic layers 20 and 40 is dispersed and attracted by particles of the acid material 30, and thus retained well in the first catalytic layer 20.

The amount of potassium contained in the first and second catalytic layers 20 and 40 after long-time use of the $NO_x$ catalyst in high temperature was measured actually. It was found that as shown by a solid line (embodiment 1) in FIG. 3, quite a large amount of potassium remained in the first catalytic layer 20, as compared with a conventional case (shown by a dotted line) in which a simple catalytic layer having no acid material mixed was used.

Another reason for quite a large amount of potassium remaining in the first catalytic layer 20 is thought as follows: In the case of a conventional $NO_x$ catalyst, when it is exposed to high temperature, nitrate of potassium easily moves within the catalyst because the melting point of nitrate of potassium is low, and easily vaporizes and escapes because the boiling point of potassium is low. In contrast, in the case of the $NO_x$ catalyst according to embodiment 1, due to the affinity to the acid material 30, the vaporization and escape of potassium is restrained, and thus potassium is retained well in the first catalytic layer 20.

Especially when the first catalytic layer 20 contains zeolite as the acid material 30, more desirable effect is obtained due to the cation exchange ability of zeolite.

Figure 4:
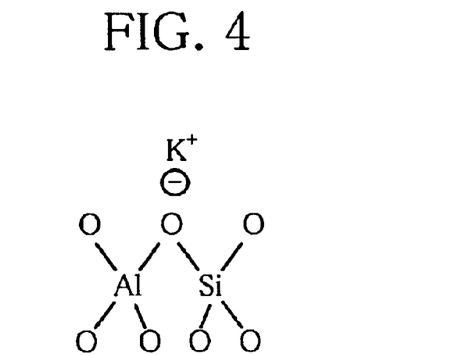
FIG. 4 is a diagram for explaining how potassium is fixed by the cation exchange ability of zeolite.

Specifically, in the presence of high-temperature vapor, potassium which moves within the $NO_x$ catalyst is ionized in some cases. It is thought that when zeolite is contained, ionized potassium is fixed as ions due to the cation exchange ability of the acid center of zeolite as shown in FIG. 4, and thus hindered from moving toward the support.

Further, zeolite, which has a three-dimensional network structure and a large specific surface area, has a molecular sieving function, and potassium is highly dispersed over this structure of zeolite. Thus, potassium is less likely to penetrate into the support.

Even when the internal combustion engine is operating in a lean state, exhaust gas contains a small amount of HC. Meanwhile, zeolite has a high ability to fix the $NO_x$ occluding agent and a high ability to absorb HC. HC absorbed by zeolite promotes degradation of nitrate and sulfate of the $NO_x$ occluding agent. To sum up, even during lean operation of the engine, zeolite having an HC absorbing ability continuously degrades nitrate and sulfate of the $NO_x$ occluding agent by using the small amount of HC which is contained in exhaust gas, and thereby contributes to restoration of the $NO_x$ occluding ability of the catalyst.

As the zeolite, various types of zeolite such as MFI-type, Y-type, X-type, mordenite, ferrienite?, β, etc. can be used. In view of structural relation to the absorbed HC seeds, zeolite of a type which is suitable for the composition of exhaust gas should be chosen.

The cation exchange ability and thermal resistance ability of zeolite depend on the composition of zeolite. The cation exchange ability is in inverse proportion to the $SiO_2/Al_2O_3$ ratio of zeolite, while the thermal resistance ability is in proportion to this ratio. Thus, for example, by making the ratio as large as possible, the thermal resistance ability can be improved, while by making the ratio small, the amount of the $NO_x$ occluding agent which is lost in long-time use of the catalyst in high temperature can be reduced and the occluding ability can be maintained.

As stated above, in the exhaust gas clean-up catalyst according to the present invention, since potassium is hindered from moving and escaping and retained well in the first catalytic layer 20, formation of compounds having a thermal expansion coefficient different from that of the cordierite support 10 in the cordierite support 10 is prevented, and thus cracks due to such compounds are prevented. As a result, the exhaust gas clean-up catalyst has an improved durability, and can keep its exhaust gas clean-up ability high.

From the examination carried out by the inventors, it was found that when the amount of the acid material 30 added to alumina was more than 30 wt %, the acid material 30 functioned as a base material. This causes problems that the catalytic function of precious metal lowers and that the ability of the acid material 30 to retain the occluding agent lowers. It was also found that when the amount of the acid material 30 added to alumina was less than 1 wt %, the fact that the amount of the acid material 30 was small caused a problem that the ability of the acid material 30 as a whole to retain the occluding agent 30 lowered, so that the occluding agent's escape and movement into the support was not restrained well.

Thus, it is desirable that in the first catalytic layer 20, the amount of the acid material 30 added to alumina is 1~30 wt %. In this case, alumina surely becomes a base material, and the amount of precious metal supported by the acid material 30 reduces. Thus, the lowering of the catalytic function is prevented, and the occluding agent is prevented from escaping and moving into the cordierite support 10, satisfactorily.

Further, in this case, even if slurry is prepared by mixing precious metal, the occluding agent, the acid material 30, alumina, etc. at a time, precious metal is supported by alumina, satisfactorily. Thus, precious metal does not need to be supported by alumina in advance. This is advantageous because this can help simplify the process of forming the catalytic layers.

When the first catalytic layer 20 which contains potassium, precious metal and also the acid material 30 is formed as a lower layer and the second catalytic layer 40 which contains potassium and precious metal but does not contain the acid material 30 is formed as an upper layer, potassium in the second catalytic layer 40 moves into the lower first catalytic layer 20 to combine with the acid material 30 and is retained there, and the amount of potassium contained in the second catalytic layer 40 decreases.

As already mentioned, potassium has a large electron-donating function, and electrons emitted from potassium lowers the $NO_x$ oxidation ability. However, when the amount of potassium contained in the second catalytic layer 40 decreases as mentioned above, the electron-donating function becomes smaller. Thus, in the second catalytic layer 40, the $NO_x$ oxidation ability does not lower, and oxidation reaction is promoted by precious metal very well. Specifically, as already mentioned, the $NO_x$ catalyst makes NO react with oxygen and with potassium, and occludes $NO_x$ in the form of nitrate (—$NO_3$), where the reaction of NO with oxygen goes on smoothly, not being hindered by the electron-donating function of potassium.

NO oxide formed by this oxidation reaction is occluded well by potassium which has moved into the first catalytic layer 20 and is retained there.

To sum up, when the first catalytic layer 20 which contains the acid material 30 is formed as a lower layer and the second catalytic layer 40 which does not contain the acid material 30 is formed as an upper layer, oxidation reaction of NO and occlusion by potassium can be carried out in a well-balanced manner.

Thus, when the first catalytic layer 20 which contains the acid material 30 is formed as a lower layer and the second catalytic layer 40 which does not contain the acid material 30 is formed as an upper layer, the $NO_x$ removing ability can be kept high.

Further, generally, the acid material 30 made of zeolite, silica, and/or the like tends to be low in thermal resistance. When the second catalytic layer 40 which does not contain the acid material 30 is formed as an upper layer, the first catalytic layer 20 which contains the acid material 30 is covered with the second catalytic layer and not exposed directly to high-temperature exhaust gas flow. This is advantageous because the durability of the acid material 30 improves.

Further, potassium contained in the upper second catalytic layer 40 moves into the lower first catalytic layer 20 and is retained there, that is, exists away from the catalyst surface. This is advantageous because the loss of potassium due to vaporization and escape from the catalyst, etc. is prevented better.

The $NO_x$ removing efficiency of the $NO_x$ catalyst after long-time use in high temperature was examined actually. It was found that in the present invention, as shown by marks Δ connected by a solid line (embodiment 1) in FIG. 5, the $NO_x$ removing efficiency was generally kept very high, irrespective of the catalyst temperature, as compared with a conventional case (shown by marks ○ connected by a dashed line) in which a simple catalytic layer having no acid material mixed was used.

One of the substances which lower the clean-up ability of the $NO_x$ catalyst is sulfate formed by S (sulfur). In embodiment 1, potassium in the second catalytic layer 40, which reacts with sulfur, decreases. Thus, growth of such sulfate (—$SO_4$) can be restrained.

Figure 6:
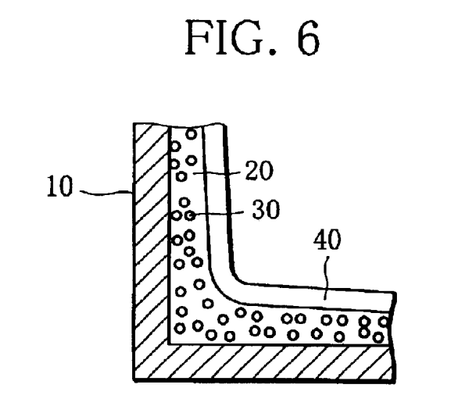
FIG. 6 is a partial enlarged cross-section showing a quarter of a cell of an exhaust gas clean-up catalyst according to the present invention, wherein acid material exists in particles or blocks.

It is to be noted that as long as the acid material 30 is mixed in the same first catalytic layer 20, the acid material 30 may exist in somewhat large particles or blocks, as shown in FIG. 6. Also in that case, the present invention works well.

While in the above-described case, slurries are prepared for the first and second catalytic layers 20 and 40, separately, to thereby form the first and second catalytic layers 20 and 40, the way of forming the first and second catalytic layers 20 and 40 is not restricted to this.

For example, the first and second catalytic layers 20 and 40 may be formed as follows: First, slurry which contains at least one precious metal chosen from a group consisting of platinum, rhodium and palladium, alkaline metal such as potassium (K) and/or alkaline earth metal such as barium (Ba), which are each an $NO_x$ occluding agent, and alumina is prepared. Then, the cordierite support 10 which supports only the acid material 30 on its surface in advance is immersed in the slurry, then dried, and then baked to thereby form a first catalytic layer 20 which contains the acid material 30. Then, the cordierite support 10 with the first catalytic layer 20 on is immersed in the slurry again, then dried, and then baked to thereby form a second catalytic layer 40 in which alumina supports only precious metal and alkaline metal and/or alkaline earth metal.

In this method, since the first and second catalytic layers 20 and 40 can be formed using the same slurry, the production cost can be reduced. Further, in this method, the acid material 30 functioning as a base material is restrained. This leads to advantages that the lowering of the catalytic function of precious metal can be prevented, and that the occluding agent's escape and movement into the cordierite support 10 can be prevented.

Next, embodiment 2 will be described.

Figure 7:
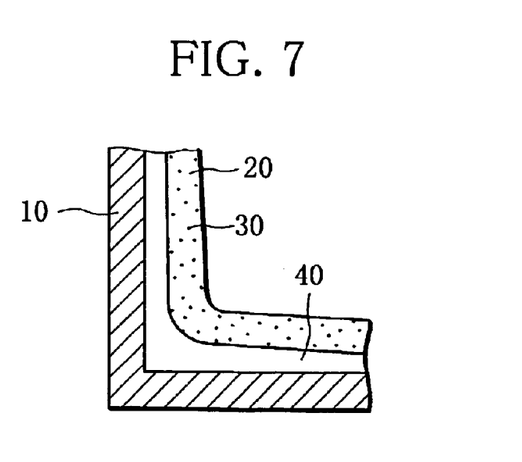
FIG. 7 is a partial enlarged cross-section showing a quarter of a cell of an exhaust gas clean-up catalyst according to embodiment 2 of the present invention.

FIG. 7 shows part of a cell of a cordierite support of embodiment 2. In embodiment 2, a second catalytic layer 40 covers the surface of the cordierite support 10, and a first catalytic layer 40 covers the surface of the first catalytic layer 20. Thus, in embodiment 2, the first and second catalytic layers 20 and 40 are reverse in position as compared with embodiment 1. The second catalytic layer 40 which does not contain the acid material 30 and does contain potassium and precious metal is formed between the cordierite support 10 and the first catalytic layer 20.

The way of forming the first and second catalytic layers 20 and 40 in embodiment 2 is the same as that in embodiment 1. Here, the functions and effects different from those of embodiment 1 will be mainly explained.

As in embodiment 1, also in embodiment 2, it is thought that potassium in the first and second catalytic layers 20 and 40 is dispersed and attracted by particles of the acid material 30 due to the affinity of the acid material 30 and thereby retained in the first catalytic layer 20.

The amount of potassium contained in the first and second catalytic layers 20 and 40 after long-time use of the $NO_x$ catalyst in high temperature was measured actually. It was found that as shown by a solid line (embodiment 2) in FIG. 3, quite a large amount of potassium remained in the first catalytic layer 20, like in embodiment 1, as compared with a conventional case (shown by a dotted line) in which a simple catalytic layer having no acid material mixed was used.

Thus, also in embodiment 2, since potassium is hindered from moving and escaping and retained well in the first catalytic layer 20, formation of compounds having a thermal expansion coefficient different from that of the cordierite support 10 in the cordierite support 10 is prevented, and thus formation of cracks in the cordierite support 10 due to such compounds is prevented. As a result, the exhaust gas clean-up catalyst has an improved durability, and can keep its exhaust gas clean-up ability high.

When the first catalytic layer 20 which contains potassium, precious metal and also the acid material 30 is formed as an upper layer and the second catalytic layer 40 which contains potassium and precious metal but does not contain the acid material 30 is formed as a lower layer, potassium in the second catalytic layer 40 moves into the upper first catalytic layer 20 to combine with the acid material 30 and is retained there, and the amount of potassium contained in the lower second catalytic layer 40 decreases.

When the amount of potassium contained in the second catalytic layer 40 thus decreases, the electron-donating function becomes smaller as in embodiment 1. Thus, in the second catalytic layer 40, the $NO_x$ oxidation ability does not lower, and oxidation reaction is promoted by precious metal very well. NO oxide formed by this oxidation reaction is occluded well by potassium which has moved into the first catalytic layer 20 and is retained there.

To sum up, also when the first catalytic layer 20 which contains the acid material 30 is formed as an upper layer and the second catalytic layer 40 which does not contain the acid material 30 is formed as a lower layer, oxidation reaction of NO and occlusion by potassium can be carried out in a well-balanced manner. Thus, the $NO_x$ removing ability can be kept high.

The $NO_x$ removing efficiency of the $NO_x$ catalyst after long-time use in high temperature was examined actually. It was found that in the present invention, as shown by marks □ connected by a solid line (embodiment 2) in FIG. 5, the $NO_x$ removing efficiency was generally kept very high, irrespective of the catalyst temperature, like in embodiment 1, as compared with a conventional case (shown by marks ○ connected by a dashed line) in which a simple catalytic layer having no acid material mixed was used.

It is to be noted that when potassium increases in the upper layer, exhaust gas comes in contact with potassium more easily. Thus, not only $NO_x$ but also sulfur in exhaust gas reacts with potassium more easily. In other words, the $NO_x$ catalyst suffers sulfur-poisoning more easily.

However, the fact that potassium and sulfur reacts easily means that sulfur is removed from potassium easily. Specifically, in sulfur-purging, for example, fuel supply to the internal combustion engine is increased to thereby make the $NO_x$ catalyst high in temperature and make the exhaust-gas rich in air-fuel ratio to form an reducing atmosphere. In this case, potassium combined with sulfur is exposed to the high-temperature reducing atmosphere easily, so that sulfur is purged easily.

This means that the length of time in which the $NO_x$ catalyst needs to be kept at high temperature and the exhaust-gas needs to be kept at a rich air-fuel ratio can be shortened, and that the fuel supply can be reduced. Thus, deterioration of fuel economy can be prevented.

To sum up, when the first catalytic layer 20 which contains the acid material 30 is formed as an upper layer and the second catalytic layer 40 which does not contain the acid material 30 is formed as a lower layer, the $NO_x$ removing ability can be kept high, and also the length of time in which the $NO_x$ catalyst is kept at high temperature and the exhaust-gas is kept at a rich air-fuel ratio for sulfur purging can be shortened to prevent deterioration of fuel economy.

As in embodiment 1, as long as the acid material 30 is mixed in the same first catalytic layer 20, the acid material 30 may exist in somewhat large particles or blocks. Also in that case, the present invention works well.

How the present invention is carried out has been explained above. It is to be noted that how to carry out the present invention is not restricted to the above embodiments.

For example, while in the above embodiments, a honeycomb-type cordierite support is used as a porous support, the present invention can be applied to an exhaust gas clean-up catalyst having a support of a material other than cordierite. When a metal support is used, penetration of an $NO_x$ occluding agent such as potassium into the support hardly becomes a problem, while escape of the $NO_x$ occluding agent is prevented and thus the lowering of the exhaust gas clean-up ability is prevented.

When a honeycomb-type cordierite support is used, cells of the cordierite support are not restricted to a quadrangular cross-section. They can be, for example, triangular or hexagonal in cross-section.

What is claimed is:

1. An exhaust gas clean-up catalyst comprising a support and a catalytic layer, said catalytic layer containing, as an occluding agent, at least one member chosen from a group consisting of alkali metals and alkaline earth metals, wherein
    said catalytic layer consists of
        a first catalytic layer which contains (a) said alkali metal or alkaline earth metal occluding agent, (b) at least one precious metal chosen from a group consisting of platinum, rhodium and palladium, and alumina as a base material for said precious metal and said occluding material, and (c) an acid material having a high affinity to said occluding agent, and
        a second catalytic layer formed on the outside of said first catalytic layer, which second catalytic layer contains said occluding agent and does not contain said acid material.

2. The exhaust gas clean-up catalyst according to claim 1, wherein the proportion of said acid material to said alumina is in the range of 1 to 30 wt %.

3. The exhaust gas clean-up catalyst according to claim 1, wherein said second catalytic layer further contains at least one precious metal chosen from a group consisting of platinum, rhodium and palladium, and alumina as a base material for said precious metal and said occluding material.

4. The exhaust gas clean-up catalyst according to claim 1, wherein the acid material in said first catalytic layer comprises at least one material chosen from a group consisting of acid oxides which contain at least one acid substance chosen from among IV-, V-, and VI-group transition elements and IV-, V-, and VI-group non-metallic elements, compound oxides which contain said at least one acid substance, materials which do not hinder reactivity of nitrogen oxide and said occluding agent, and materials which absorb reducing substances.

5. The exhaust gas clean-up catalyst according to claim 1, wherein said occluding agent contains potassium, and said support is a porous support.

6. The exhaust gas clean-up catalyst according to claim 1, wherein said first catalytic layer contains zeolite.

* * * * *